United States Patent
Ishii et al.

(10) Patent No.: US 8,313,241 B2
(45) Date of Patent: Nov. 20, 2012

(54) MAGNETIC ENCODER AND ROLLING BEARING

(75) Inventors: Yasuhiko Ishii, Kashiwara (JP); Naoki Morimura, Kashiba (JP); Yoshihiro Itoh, Nishinomiya (JP); Takashi Kaneike, Sakai (JP)

(73) Assignees: JTEKT Corporation, Osaka-Shi, Osaka (JP); Nakanishi Metal Works Co., Ltd., Kita-Ku, Osaka (JP)

( * ) Notice: Subject to any disclaimer, the term of this patent is extended or adjusted under 35 U.S.C. 154(b) by 319 days.

(21) Appl. No.: 12/452,396

(22) PCT Filed: Jul. 3, 2008

(86) PCT No.: PCT/JP2008/062074
§ 371 (c)(1),
(2), (4) Date: Dec. 29, 2009

(87) PCT Pub. No.: WO2009/005127
PCT Pub. Date: Jan. 8, 2009

(65) Prior Publication Data
US 2010/0104230 A1  Apr. 29, 2010

(30) Foreign Application Priority Data
Jul. 4, 2007  (JP) .............................. P2007-176589

(51) Int. Cl.
*F16C 41/00* (2006.01)
(52) U.S. Cl. ................... 384/448; 324/207.25
(58) Field of Classification Search .................. 384/544, 384/448; 324/173, 174, 207.25
See application file for complete search history.

(56) References Cited

U.S. PATENT DOCUMENTS

| 7,592,798 B2 | 9/2009 | Yabe et al. |
| 2004/0086212 A1* | 5/2004 | Ohtsuki et al. ................. 384/448 |
| 2005/0007226 A1* | 1/2005 | Mizuta ........................... 335/207 |
| 2007/0139035 A1* | 6/2007 | Ishii et al. ...................... 324/174 |
| 2008/0199118 A1 | 8/2008 | Yabe et al. |

FOREIGN PATENT DOCUMENTS

| JP | 2003222150 A * | 8/2003 |
| JP | 2004-197178 | 7/2004 |
| JP | 2005-321307 (A) | 11/2005 |
| JP | 2006-90956 | 4/2006 |
| JP | 2006-90995 | 4/2006 |
| JP | 2006-329769 | 12/2006 |
| JP | 2007-101405 | 4/2007 |

OTHER PUBLICATIONS

Extended European Search Report dated Aug. 27, 2012.

* cited by examiner

*Primary Examiner* — Thomas R Hannon
(74) *Attorney, Agent, or Firm* — McGinn IP Law Group, PLLC

(57) ABSTRACT

A magnetic encoder is provided which can prevent a magnetized member from being separated from a fixed member to which the magnetized member is fixed under a severe temperature environment. The encoder includes a fixed member which is fixed to a rotating member and a magnetized member which is attached to the fixed member. The magnetized member, which is molded by mixing a magnetic powder in a resin, is bonded to the fixed member with a silicone resin based adhesive, and a thickness of an adhesive layer of the silicone resin based adhesive is 50 μm or more and 100 μm or less.

10 Claims, 5 Drawing Sheets

MAGNETIC ENCODER AND ROLLING BEARING

TECHNICAL FIELD

The present invention relates to a magnetic encoder for use in detecting a rotating condition of a wheel or the like and a bearing to which the same magnetic encoder is assembled.

BACKGROUND ART

As a rolling bearing on which a wheel of a vehicle such as a motor vehicle is mounted, there is, for example, a rolling bearing which includes an outer ring and an inner ring which is provided on the outer ring via rolling elements. In addition, a sensor device for detecting a rotating speed of a wheel is used to control an anti-lock braking system (ABS) of a motor vehicle, and there is known a configuration in which the sensor device is mounted on a sealing device for sealing an annular space between the outer ring and the inner ring so as to be integrated into the sealing device to thereby realize miniaturization of the sensor device.

As a sensor device provided on the sealing device, there is a sensor device as is shown in FIG. 5, for example, which includes a metal core 103 which is fixed to an inner circumference of an outer ring 107, which is a fixed ring, a sealing main body 106 which is attached to an inner circumferential side of the metal core 103, a magnetic encoder 101 made up of a metallic slinger 102 which is fixed to an outer circumference of an inner ring 108, which is a rotating ring, and an annular magnetized member 104 which is bonded to an outer (a right-hand side in FIG. 5) and on which N poles and S poles are magnetized alternately in a circumferential direction, and a sensor 105 which is disposed to face the magnetic encoder 101. In this sensor device, a rotating speed of a wheel is detected by the sensor 105 a change in magnetic flux generated by rotation of the magnetic encoder 101 together with the inner ring 108 (for example, refer to Patent Documents 1, 2).

Patent Document 1: JP-A-2006-90956
Patent Document 2: JP-A-2006-90995

DISCLOSURE OF THE INVENTION

Problem that the Invention is to Solve

In the conventional magnetic encoder 101 described above, the slinger 102 and the magnetized member 104 are bonded together by a phenol resin based adhesive or an epoxy resin based adhesive. In this case, the magnetic encoder 101 can bear stress that is produced by a difference in thermal expansion coefficient between the slinger 102 and the magnetized member 104 in a range from −40° C. to 120° C. which is regarded generally as a severe temperature environment, and the magnetized member 104 can be prevented from being separated from the slinger 102, for example.

However, the magnetic encoder 101 cannot bear stress produced by the difference in thermal expansion coefficient under an environment severer than the aforesaid temperature environment, and the magnetized member 104 is separated from the slinger 102, leading to a problem that the magnetic encoder 101 cannot be used.

The invention has been made in view of the problem, and an object thereof is to provide a magnetic encoder which can prevent a magnetized member from being separated from a fixed member to which the magnetized member is fixed under a severe temperature environment and a bearing to which the magnetic encoder is assembled.

Means for Solving the Problem

The inventors have studied conditions in which adhesives are used which are used in magnetic encoders in order to attain the object. The inventor and others have paid attention to the fact that in rolling bearings, magnetic encoders are made by integrating a magnetized member which is molded by mixing magnetic powder into a resin matrix into a surface of a slinger of a sealing device via a silicone based adhesive film. Normally, the thickness of an adhesive film is preferably made thinner in order to make the adhesive force of an adhesive higher. However, as a result of studies made on the adaptability to shearing stress at the time of thermal expansion, as will be shown in an example which will be described later, it has been implied that an optimum using condition of adhesives is to use a silicone resin based adhesive with the thickness of an adhesive film falling in a range from 50 μm or more to 100 μM or less.

In addition, a thermal shock test has been carried out to study the durability of silicone resin based adhesives against thermal shocks (150° C. to −40° C.) in the optimum using condition. Although details of this test will be shown in the example, which will be described later, it has been verified that the silicone resin based adhesives have sufficient thermal shock resistance under the optimum using condition (the thickness of an adhesive film is 50 μm or more and 100 μm or less).

Based on the result above, with a view to attaining the object, according to the invention, there is provided a magnetic encoder comprising a fixed member which is fixed to a rotating member and a magnetized member which is attached to the fixed member, characterized in that the magnetized member is bonded to the fixed member with a silicone resin based adhesive, and in that a thickness of an adhesive film of the silicone resin based adhesive is 50 μm or more and 100 μm or less.

Further, according to the invention, there is provided a rolling bearing comprising an inner ring on which a wheel of a vehicle is mounted, an outer ring provided so as to fit on the inner ring, a plurality of rolling elements provided between the inner ring and the outer ring, and an annular sealing device provided at an axial end portion for sealing an annular space between the inner ring and the outer ring, characterized in that the sealing device comprises a metal core fitted in the outer ring so as to be secured thereto and an annular slinger fitted on the inner ring so as to be secured thereto and comprises further a magnetic encoder which is made by integrating a magnetized member which is molded by mixing powder of a magnetic material into a resin matrix into a surface of the slinger via a silicone based adhesive film.

In the magnetic encoder of the invention, since the magnetized member is bonded to the fixed member by the silicone resin base adhesive and the thickness of the adhesive film of the silicone resin based adhesive is 50 μm or more and 100 μm or less, compared with the conventional case in which the silicone resin based adhesive is not used in that condition, stress produced by a difference in thermal expansion coefficient between the fixed member and the magnetized member under the severe environment can be borne, thereby making it possible to prevent the magnetized member being separated from the fixed member.

In addition, an adhesive surface of the fixed member with the magnetized member may be worked to be roughened.

According to this configuration, the adhesive enters the roughened surface of the fixed member, so that the magnetized member can be bonded more rigidly.

Additionally, the magnetized member is preferably molded by mixing magnetic powder into a resin. According to this construction, elasticity and magnetic properties of magnetized members which match applications thereof can be obtained by changing types and compositions of resins and magnetic powder.

In addition, the rotating member may constitute an inner ring of a bearing, and the fixed member may constitute a slinger of a sealing device provided on the bearing which is fitted on the inner ring. According to the construction, in the sensor device provided on the sealing device of the bearing, the magnetized member can be prevented from being separated from the slinger.

Advantage of the Invention

According to the magnetic encoder of the invention, since the magnetized member is bonded to the fixed member by the silicone resin based adhesive and the thickness of the adhesive film of the silicone resin based adhesive is 50 μm or more and 100 μM or less, the magnetized member can be prevented from being separated from the fixed member to which the magnetic member is fixed under the severe temperature environment.

In addition, according to the rolling bearing of the invention, the magnetized member can be prevented from being separated from the fixed member to which the magnetized member is fixed under the severe temperature environment by incorporating the magnetized member which is molded by missing the power of a magnetic material into the resin matrix into the surface of the slinger via the silicone based adhesive film.

BEST MODE FOR CARRYING OUT THE INVENTION

Figure 1:
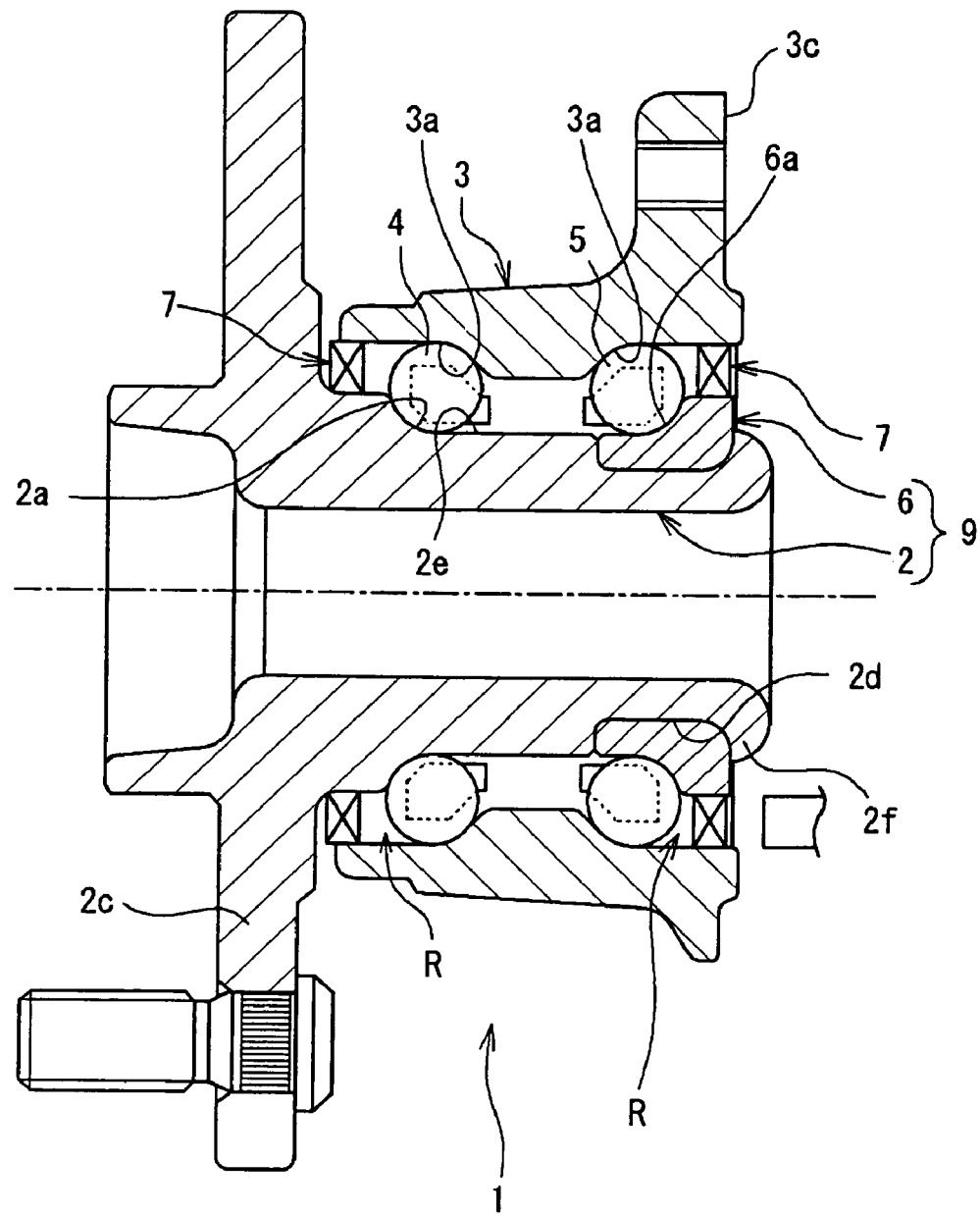
FIG. 1 A sectional view showing a rolling bearing to which a magnetic encoder according to an embodiment of the invention is assembled.
Figure 2:
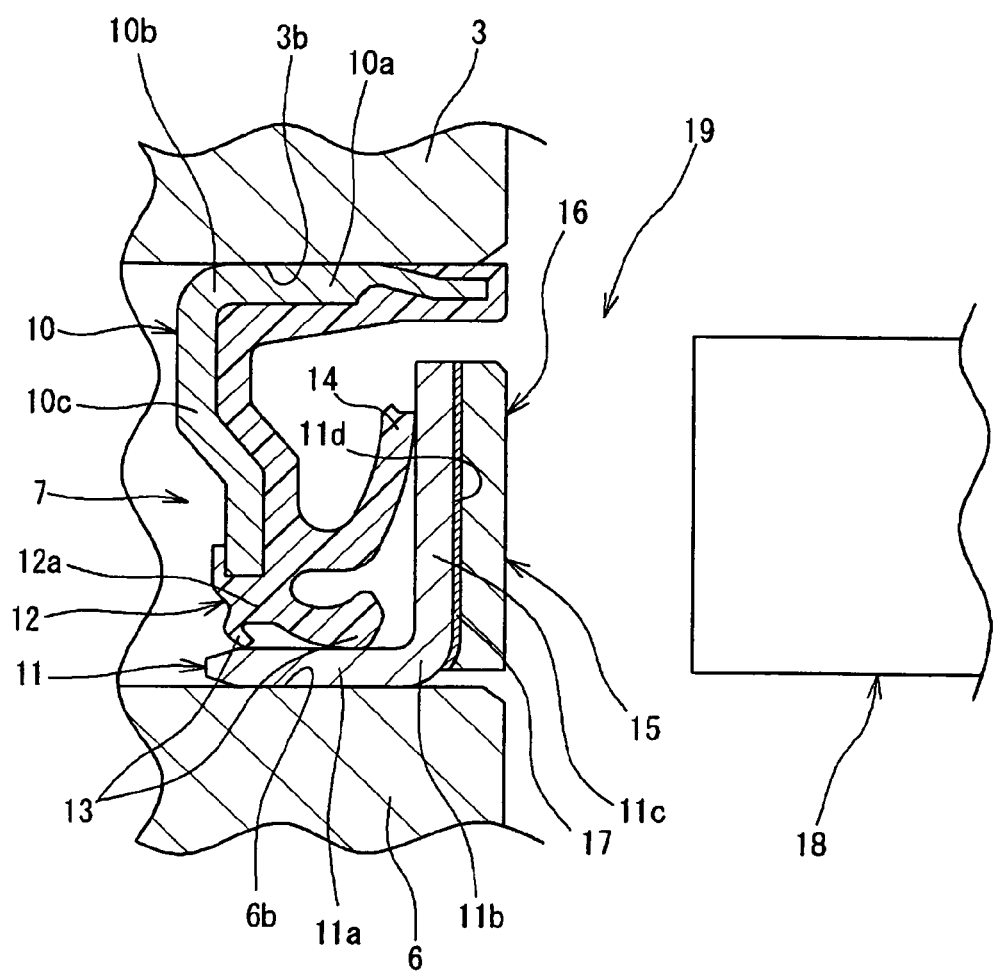
FIG. 2 A sectional view showing the magnetic encoder in FIG. 1.

Hereinafter, referring to the drawings, an embodiment of a magnetic encoder and a rolling bearing of the invention will be described. FIG. 1 is a sectional view showing a rolling baring to which a magnetic encoder according to an embodiment of the invention is assembled. FIG. 2 is a sectional view showing the magnetic encoder in FIG. 1. Note that in these drawings, a left-right or horizontal direction is referred to as an axial direction, and an up-down or vertical direction is referred to as a diametrical direction. In addition, as has been described previously, an exterior side of a sealing device is referred to as an axially outer side, and an interior side as an axially inner side.

As shown in FIG. 1, this rolling bearing 1 includes an inner ring 9 on which a wheel of a vehicle is mounted, an outer ring 3 which is provided so as to fit on the inner ring 9, and a plurality of or double rows of rolling elements 4, 5 provided between the inner ring 9 and the outer ring 3.

In addition, the inner shaft 2, which is a rotating member, has a flange 2c on which a wheel-side member (not shown) is mounted at an end portion thereof which faces a vehicle's outer side (on a left-hand side in FIG. 1), and a small diameter portion 2d is formed on a side of the inner shaft 2 which faces a vehicle's inner side (on a right-hand side in FIG. 1), whereby an inner ring constituting member 6 is fitted on the small diameter portion 2d. The inner ring 9 is made up of the inner ring constituting member 6 and the inner shaft 2. An inner raceway 6a for the row of rolling elements 5 on a side facing the vehicle's inner side is formed on an outer circumferential surface of the inner ring constituting member 6. In addition, an inner raceway 2a for the row of rolling elements 4 on a side facing the vehicle's outer side is formed at an intermediate diameter portion 2e which is situated at an axially intermediate portion of the inner shaft 2. Further, an end portion of the inner shaft 2 which faces the vehicle's inner side has a crimped portion 2f which is formed by expanding an outer circumferential side radially outwards, and this crimped portion 2f prevents the dislocation of the inner ring constituting member 6 from the inner shaft 2 so as for the inner ring constituting member 6 to be fixed to the inner shaft 2.

The outer ring 3 is fitted on the inner ring 9 via the double rows of rolling elements 4, 5 and is provided concentrically with the inner ring 9. Double rows of outer raceways 3a for the double rows of rolling elements 4, 5 are formed on an inner circumferential surface of the outer ring 3. A flange 3c is formed on an outer circumferential surface of the outer ring 3, and by this flange 3c being attached to a vehicle body side member, not shown, the bearing is fixed to the vehicle body side member. Namely, the outer ring 3 is referred to as a fixed side and the inner ring 9 is referred to as a rotating side which rotates about an axis thereof. In addition, annular sealing devices 7 are provided at both axial end portions to seal an annular space R between the inner ring 9 and the outer ring 3.

The sealing device shown in the sectional view of FIG. 2 is such as to be used as the sealing device on the vehicle's outer side in FIG. 1. This sealing device 7 is provided between an inner circumferential surface 3b of the outer ring 3 and an outer circumferential surface 6b of the inner ring constituting member 6, so as to prevent leakage of a lubricant in an interior of the bearing which constitutes a rolling element 4, 5 side thereof and infiltration of foreign matters such as muddy water and the like into the rolling element 4, 5 side from an exterior portion of the bearing. The sealing device 7 includes a metal core 10 which is fitted in the outer ring 3 so as to be secured thereto and a slinger 11 which is fitted on the inner ring constituting member 6 so as to be secured thereto.

The metal core 10 is made up of a metal core cylindrical portion 10a which is fitted in the outer ring 3 and a metal core annular portion 10c which is bent radially inwards from an axial end portion 10b of the metal core cylindrical portion 10a and has a substantially L-shaped section. The metal core 10 is made into an annular shape on the whole and is formed by pressing, for example, cold-rolled steel sheet such as SPCC, SPCD, SPEC or the like. In addition, a sealing main body 12 which is made up of an elastic member such as rubber, for example, is secured to the metal core 10 so as to be integrated with the metal core 10.

The slinger 11 is made up of a slinger cylindrical portion 11a which is fitted on the outer circumferential surface 6b of the inner ring constituting member 6 and a slinger annular portion 11c which is bent radially outwards from the other axial end portion of the slinger cylindrical portion 11a and has an L-shaped section. This slinger 11 is made into an annular shape on the whole and is formed by pressing, for example, sheet metal such as stainless steel or the like.

The sealing main body 12 has a base portion 12a which is attached to a radially inward end portion on the other axial side of the metal core annular portion 10c and includes radial lips 13 which extend from the base portion 12a in an elastically deformed condition so as to be brought into sliding contact with an outer circumferential surface of the slinger cylindrical portion 11a and an axial lip 14 which extends from the base portion 12a in an elastically deformed condition so as to be brought into sliding contact with an axially inner surface of the slinger annular portion 11c.

In addition, the sealing device 7 is assembled so that the metal core cylindrical portion 10a of the metal core 10 faces, the slinger cylindrical portion 11a of the slinger 11 and that the metal core annular portion 10c of the metal core 10 and the slinger annular portion 11c of the slinger 11.

An annular magnetized member 15 is bonded to an axially outer surface 11d of the slinger 11 so as to be integrated with the slinger 11, and this magnetized member 15 and the slinger 11 make up a magnetic encoder 16. Then, this magnetic encoder 16 and a sensor 18 which is disposed to face the magnetized member 15 of the magnetic encoder 16 make up a sensor device 19.

The magnetized member 15 is an annular magnet on which N poles and S poles are magnetized alternately in a circumferential direction, and a plastic magnet which is injection molded by mixing powder of a magnetic material such as a ferrite based magnet into a thermoplastic resin matrix such as a polyamide based resin or the like, a bonded magnet (a rubber magnet) which is molded by mixing powder of a magnetic material such as a neodymium based magnet into a synthetic resin matrix such as rubber or the like is used. By changing types and mixing compositions of these resins and magnet powders, magnetic encoders 16 can be formed which have heat resistances, magnetic force properties and the like according to various applications.

The sensor 18 is made up of an eddy current displacement sensor, for example. The sensor 18 generates a magnetic field between the magnetic encoder 16 and itself and detects a change in a magnetic flux density of the magnetic field which corresponds to the rotation of the bearing by a detecting unit. In addition, the sensor 18 is designed to output the change as a detection (voltage) signal to a control unit such as an ECU or the like of a vehicle, which is not shown.

In the magnetic encoder 16 of the embodiment, the slinger 11 and the magnetized member 15 are bonded together at an adhesive surface 17 with a silicone based adhesive. The silicone based adhesive is an adhesive which uses a thermoplastic resin such as organopolysiloxane or the like as a principal constituent. In addition, since the silicone based adhesive has superior heat resistance and freeze resistance and is made into an rubber-like elastic substance when it sets, the silicone adhesive can be used to bond a target material for bonding which has a large thermal expansion coefficient difference and which generates large shearing stress.

In addition, a thickness of an adhesive film of the silicone based adhesive is optimally 50 µm or more and 100 µm or less when considering thermal shock resistance. The grounds for the optimal condition will be described in the following example.

In addition, since the axially outer surface 11d of the slinger annular portion 11c which constitutes the adhesive surface of the slinger 11 with the magnetized member 15 is worked to be roughened through shot peening, for example, the adhesive force by the silicone based adhesive is strengthened further.

EXAMPLE

Figure 3:
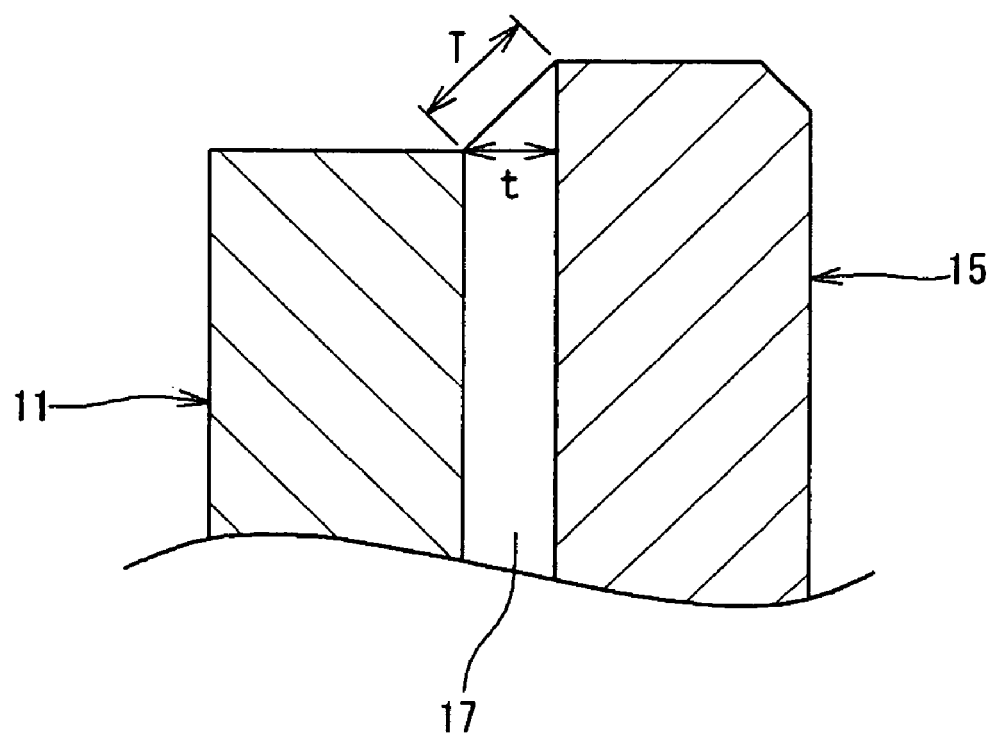
FIG. 3 A sectional view showing a thickness of an adhesive film of a silicone resin base adhesive when a thermal deformation occurs.
Figure 4:
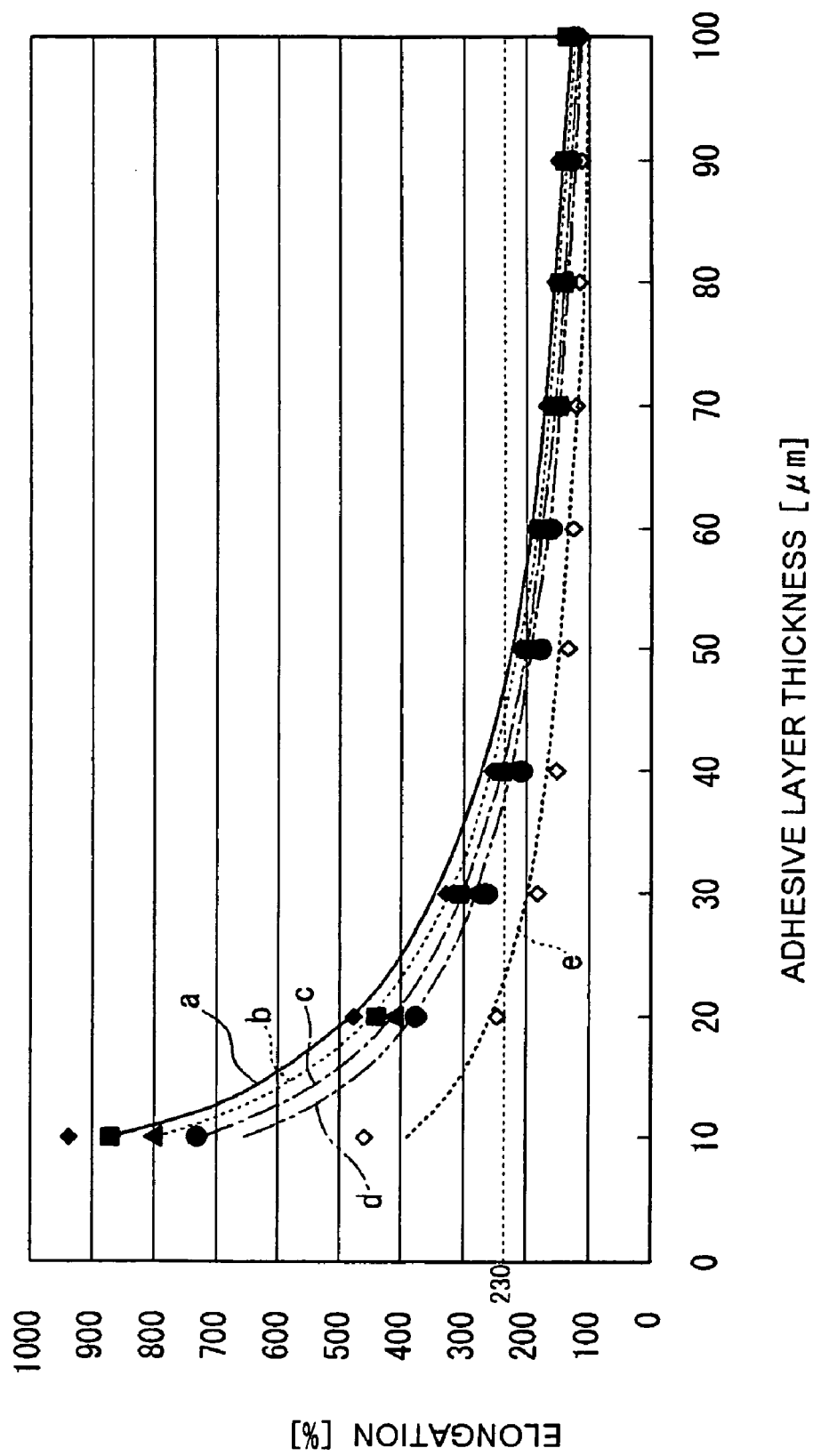
FIG. 4 A graph showing a relationship between thickness and elongation of a silicone resin based adhesive.
Figure 5:
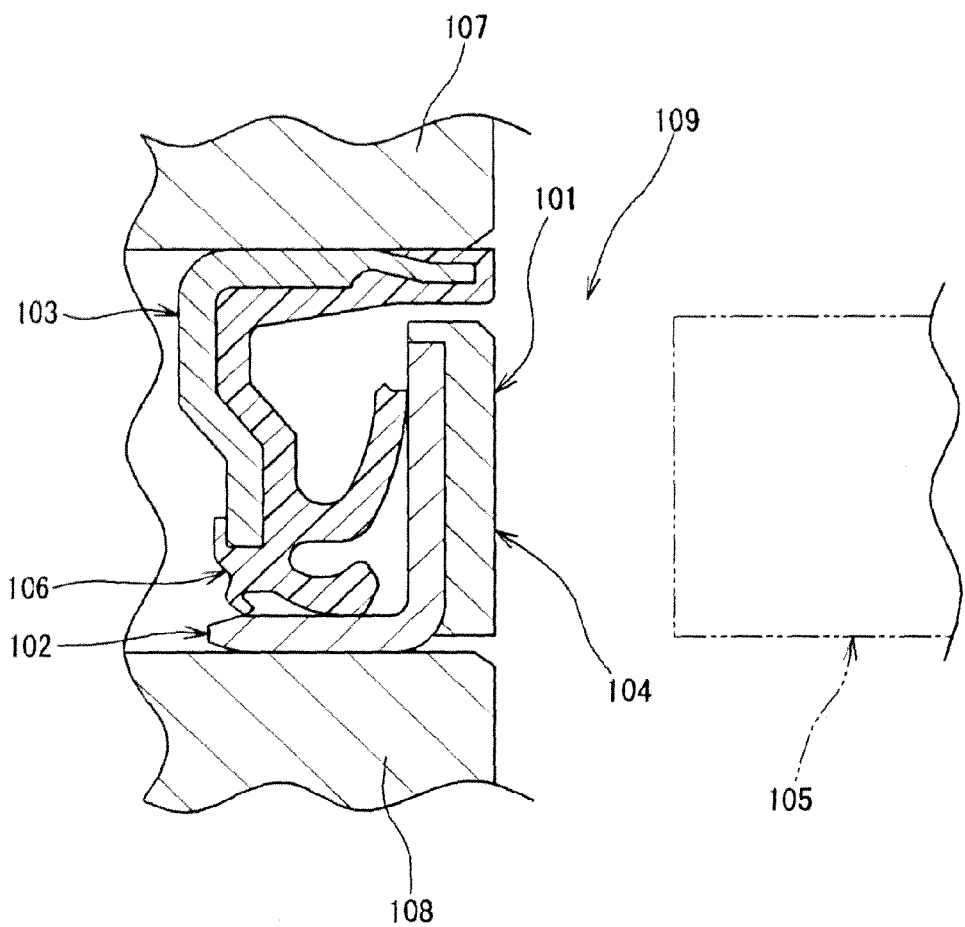
FIG. 5 A sectional view showing a conventional magnetic encoder.

Verification Test on Relationship Between Adhesive Film Thickness and Elongation FIG. 3 is a sectional view showing a thickness of the adhesive film of the silicone resin based adhesive when a thermal deformation occurs. In addition, FIG. 4 is a graph showing a relationship between thickness and elongation of an adhesive film of a silicone resin based adhesive.

With a view to attaining the object of the invention, the adaptability of adhesives to shearing stress or elongations of adhesives at the time of thermal expansion have been verified.

As is show in FIG. 3, the test was carried out with a magnetized member 15 bonded to the slinger 11 with a silicone resin based adhesive and elongations (%) of adhesives were calculated by the following calculation formula with a length of a gradient of an adhesive at the time of thermal expansion defined as T and a thickness of an adhesive film as t. In addition, TSE 322 made by GE Toshiba Inc. was used as a silicone resin based adhesive.

Elongation (%)=$T/t \cdot 100$

In addition, the details of line graphs (a to e) are as follows.

a: a temperature change from 25° C. to 150° C.

b: a temperature change from 25° C. to 140° C.

c: a temperature change from 25° C. to 130° C.

d: a temperature change from 25° C. to 120° C.

e: a temperature change from 25° C. to −40° C.

A limit value at which the silicone resin based adhesive used in this verification test can be used is 230% in elongation. Namely, when the elongation surpasses 230%, the adhesive fails and cannot be used any more.

As is shown in FIG. 4, in the temperature conditions a to e above, the elongation lowers below 230% when the film thickness of the adhesive is 50 µm or more. In contrast, when the film thickness surpasses 100 µm, the setting performance of the adhesive is reduced remarkably, which is not practical.

Consequently, an optimum using condition in which the silicone resin based adhesive according to the invention bears shearing stress at the time of thermal expansion is implied to occur when the adhesive layer thickness is 50 µm or more and 100 µm or less.

<Thermal Shock Test Results>

Next, a thermal shock test was carried out to verify the durability against thermal shock of the silicone resin based adhesive according to the invention under the optimum using condition (the adhesive layer thickness is 50 µm or more and 100 µm or less).

As a test condition, adhesives were treated at 150° C. for 10 minutes, and thereafter, thermal shock was applied to the adhesives by repeating a high-temperature treatment and a low-temperature treatment as a treatment at −40° C. for 10 minutes being referred to as one cycle, so as to verify the numbers of cycles that the adhesives could bear. The following adhesives were used as examples and a comparison example.

Example 1

Silicone Resin Based Adhesive (TSE 322 by GE Toshiba Inc.)

Example 2

Silicone Resin Based Adhesive (TSE3280-G by GE Toshiba Inc.)

Example 3

Silicone Resin Based Adhesive (KE-347 by Shinetsu Silicone Company Ltd.)

Comparison Example 1

Phenol Resin Based Adhesive (C-12 by Tokyo Chemical Company Ltd.)

The results of the test are shown in Table 1.

TABLE 1

| Thermal shock test results (150° C. 10 min <-> −40° C. 10 min) | |
|---|---|
| Example 1: | 1015 cycles, no problem occurred |
| Example 2: | 1015 cycles, no problem occurred |
| Example 3: | 1015 cycles, no problem occurred |
| Comparison Example 1: | 421 to 890 cycles, cracks generated |
| Example 1: | Silicone resin based adhesive (TSE 322 by GE Toshiba Inc.) |
| Example 2: | Silicone resin based adhesive (TSE3280-G by GE Toshiba Inc.) |
| Example 3: | Silicone resin based adhesive (KE-347 by Shinetsu Silicone Company Ltd.) |
| Comparison Example 1: | Phenol resin based adhesive (C-12 by Tokyo Chemical Company Ltd.) |

It is verified from the results shown in Table 1 that compared with the conventional phenol resin based adhesive, the silicone resin based adhesives have sufficient thermal shock resistances under the optimum using condition (the adhesive layer thickness is 50 µm or more and 100 µm or less).

In addition, the magnetic encoder 16 of the invention can also be assembled to other vehicle rolling bearings than the rolling bearing 1 exemplified in the embodiment which include, for example, a tapered roller bearing and a straight roller bearing. In addition, the application of the magnetic encoder of the invention is not limited to vehicles. It is also applicable to bearing devices in general-use machineries. In addition, although the magnetized member 15 is described as being bonded only to the axially outer surface 11*d*, the magnetized member 15 may be bonded from a radially outer end portion to the axially outer surface 11*d* of the slinger annular portion 11*c*.

The invention claimed is:

1. A magnetic encoder comprising a fixed member which is fixed to a rotating member and a magnetized member which is attached to the fixed member,
    wherein the magnetized member is bonded to the fixed member with a silicone resin based adhesive, and
    wherein a thickness of an adhesive layer of the silicone resin based adhesive is in a range from 50 µm to 100 µm.
2. A magnetic encoder as set forth in claim 1, wherein an adhesive surface of the fixed member on which the magnetized member is attached is worked to be roughened.
3. A magnetic encoder as set forth in claim 1, wherein the magnetized member is molded by mixing a magnetic powder in a resin.
4. A magnetic encoder as set forth in claim 1, wherein the rotating member is an inner ring of a bearing, and the fixed member is a slinger of a sealing device provided on the bearing which is fitted on the inner ring.
5. A magnetic encoder as set forth in claim 1, wherein the silicone resin based adhesive comprises organopolysiloxane.
6. A magnetic encoder as set forth in claim 1, wherein the magnetized member comprises a magnetic material and a thermoplastic resin.
7. A magnetic encoder as set forth in claim 6, wherein the fixed member includes a roughened adhesive surface on which the magnetized member is disposed.
8. A magnetic encoder as set forth in claim 1, wherein the magnetized member comprises a bonded magnet.
9. A rolling bearing comprising an inner ring on which a wheel of a vehicle is mounted, an outer ring provided so as to fit on the inner ring, a plurality of rolling elements provided between the inner ring and the outer ring, and an annular sealing device provided at an axial end portion for sealing an annular space between the inner ring and the outer ring, wherein
    the sealing device comprises a metal core fitted in the outer ring so as to be secured thereto and an annular slinger fitted on the inner ring so as to be secured thereto, and comprises further
    a magnetic encoder which is made by integrating a magnetized member which is molded by mixing a powder of a magnetic material into a resin matrix into a surface of the slinger via a silicone based adhesive layer, and
    wherein the adhesive layer thickness of the silicone resin based adhesive is in a range from 50 µm to 100.
10. A rolling bearing as set forth in claim 9, wherein the slinger comprises a slinger cylindrical portion which is fitted on an outer circumferential surface of the inner ring and a slinger annular portion which is bent radially outwards from an axial end portion of the slinger cylindrical portion, and in that the magnetized member is bonded to an axially outer surface of the slinger.

* * * * *